United States Patent
Black et al.

(10) Patent No.: US 7,852,853 B1
(45) Date of Patent: Dec. 14, 2010

(54) SYSTEM AND METHOD FOR TRANSMITTING VIDEO INFORMATION

(75) Inventors: James D. Black, San Francisco, CA (US); Claudio R. Lima, San Jose, CA (US); Renxiang Huang, Sunnyvale, CA (US); James J. Pan, Cupertino, CA (US)

(73) Assignee: Nextel Communications Inc., Reston, VA (US)

( * ) Notice: Subject to any disclaimer, the term of this patent is extended or adjusted under 35 U.S.C. 154(b) by 739 days.

(21) Appl. No.: 11/348,344

(22) Filed: Feb. 7, 2006

(51) Int. Cl.
*H04L 12/28* (2006.01)
*H04L 12/56* (2006.01)

(52) U.S. Cl. .......................... 370/395.42; 370/395.64; 380/201; 714/6; 714/751

(58) Field of Classification Search ............ 370/395.64; 380/201
See application file for complete search history.

(56) References Cited

U.S. PATENT DOCUMENTS

| | | | | |
|---|---|---|---|---|
| 5,168,356 A * | 12/1992 | Acampora et al. | ..... | 375/240.15 |
| 5,617,541 A * | 4/1997 | Albanese et al. | ............ | 709/207 |
| 5,805,762 A * | 9/1998 | Boyce et al. | ................... | 386/68 |
| 6,317,462 B1 * | 11/2001 | Boyce | .................... | 375/240.27 |
| 6,323,909 B1 * | 11/2001 | Michener et al. | ............ | 348/512 |
| 6,430,159 B1 * | 8/2002 | Wan et al. | .................... | 370/246 |
| 6,490,705 B1 * | 12/2002 | Boyce | ......................... | 714/776 |
| 6,747,991 B1 * | 6/2004 | Hemy et al. | ................. | 370/468 |
| 6,882,634 B2 * | 4/2005 | Bagchi et al. | ................ | 370/338 |
| 6,907,038 B2 * | 6/2005 | Ding et al. | ................ | 370/395.1 |
| 6,944,169 B1 | 9/2005 | Yoshizawa et al. | | |
| 6,954,800 B2 * | 10/2005 | Mallory | ....................... | 709/240 |
| 7,376,191 B2 * | 5/2008 | Melick et al. | ................ | 375/259 |
| 2002/0031114 A1 * | 3/2002 | Terry et al. | .................. | 370/352 |
| 2004/0114576 A1 * | 6/2004 | Itoh et al. | ..................... | 370/352 |
| 2004/0170182 A1 * | 9/2004 | Higashida et al. | ........... | 370/401 |
| 2004/0212729 A1 * | 10/2004 | Yamaguchi et al. | ....... | 348/387.1 |
| 2004/0261113 A1 * | 12/2004 | Paul et al. | ..................... | 725/90 |
| 2005/0013249 A1 * | 1/2005 | Kong et al. | .................. | 370/235 |
| 2005/0169312 A1 * | 8/2005 | Cakareski et al. | ........... | 370/473 |
| 2005/0226463 A1 * | 10/2005 | Suzuki et al. | ................ | 382/103 |
| 2005/0243835 A1 | 11/2005 | Sharma et al. | | |
| 2005/0254447 A1 * | 11/2005 | Miller-Smith | ................ | 370/315 |
| 2006/0130104 A1 * | 6/2006 | Budagavi | ..................... | 725/105 |
| 2006/0146934 A1 * | 7/2006 | Caglar et al. | ............ | 375/240.12 |
| 2006/0291475 A1 * | 12/2006 | Cohen | .................... | 370/395.42 |
| 2007/0019551 A1 * | 1/2007 | Pozhenko et al. | ............ | 370/235 |

* cited by examiner

*Primary Examiner*—Daniel J Ryman
*Assistant Examiner*—Jae Y Lee

(57) ABSTRACT

Systems and methods for transmitting video are provided. The system determines the type of encoded video frames. Each of the video frames is then placed in a network transport packet. A priority level of the network transport packet is set based on the determined type of the video frame. The system can apply error correction coding to video frames of a lower priority level.

20 Claims, 4 Drawing Sheets

US 7,852,853 B1

SYSTEM AND METHOD FOR TRANSMITTING VIDEO INFORMATION

BACKGROUND OF THE INVENTION

Bandwidth consumption is a perennial concern in delivering information over communications networks. In order to conserve bandwidth information is typically compressed prior to transmission. The compressed information is transmitted as one or more packets over a communication network and decompressed by the receiver. Impairments in communications networks can prevent the one or more packets of the compressed information from reaching the receiver. For example, interference or network congestion can prevent one or more packets of the compressed information from reaching the receiver. Depending upon the type of compression technique employed, the information may not be able to be decompressed by the receiver when less than all of the packets are received.

In order to improve the likelihood of reception of packets in communications networks, error correction coding, error protection coding and/or retransmission techniques may be employed. However, error correction coding and error protection coding decrease the amount of information in each packet, and thus increases bandwidth consumed by transmitting information. Similarly, retransmission techniques increase bandwidth consumed in the transmission of information.

SUMMARY OF THE INVENTION

The present invention addresses the above-identified and other deficiencies of conventional information transmission techniques. In accordance with exemplary embodiments of the present invention, particular video frames of a video stream are assigned a higher priority level than other video frames of the video stream. The priority level is included in a network transport packet which carries a video frame. Accordingly, transport networks do not need to be aware of the particular type of information in the packet, only that a network transport packet has a particular priority level. Network transport packets with a higher priority level will be granted a higher quality of service (QoS) by the network, increasing the likelihood that these packets will be delivered to the receiver.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
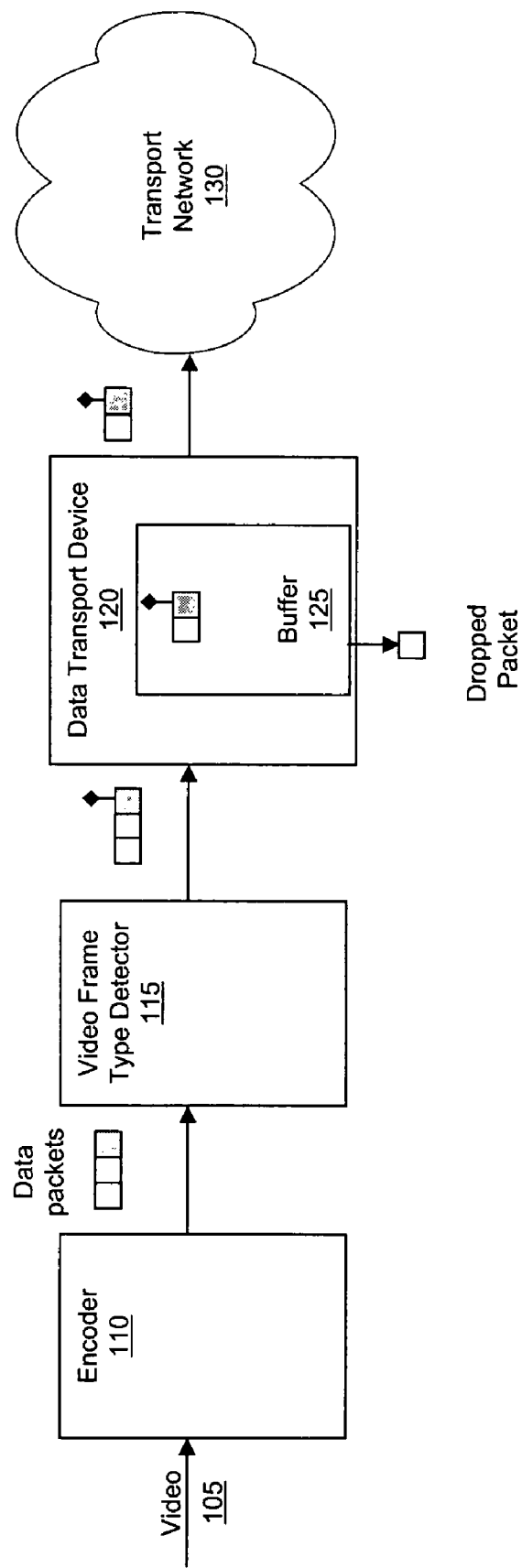
FIG. 1 is a block diagram of an exemplary system in accordance with the present invention.

FIG. 1 is a block diagram of an exemplary system in accordance with the present invention. The system includes an encoder 110, video frame type detector 115, data transport device 120 and transport network 130. Although illustrated as separate elements, encoder 110, video frame type detector 115 and data transport device 120 can be integrated into a single component. Transport network 130 can be any type of wired and/or wireless network.

Encoder 110 receives a plurality of video frames of a video stream 105. When encoder 110 encodes video according to the Motion Pictures Experts Group (MPEG) Group of Pictures (GOP) structure, video is encoded into three different types of frames, I-frames, P-frames and B-frames. I-frames include all of the visual information in a video frame, analogous to a JPEG picture. An I-frame is created when major new content is encoded, such as a scene change. P-frames and B-frames are designed to reduce the amount of information required to encode/decode an acceptable image. Accordingly, P-frames and B-frames only include information describing how one particular frame differs from another. P-frames include data providing information about changes in motion (such as motion, color, texture and the like) from the previous frame. B-frames rely on the frames preceding and following them and contain only the data that have changed from the preceding or are different from the data in the next frame.

Due to the GOP structure, loss of an I-frame is more severe than loss of a P-frame or B-frame. Specifically, P-frames and B-frames may be lost with an almost imperceptible effect on picture quality. However, without the I-frame, all references in the subsequent P-frames and B-frames are meaningless. A lost I-frame results in a black screen or freeze frame for the period of time until a new I-frame is received to resume normal video transmission. Because of the importance of I-frames, the standards require I-frames to be periodically inserted into a video stream, regardless of whether any changes occur, in order to limit the duration of any interruption. The repetition of I-frames with the same information unnecessarily consumes bandwidth in order to reduce the effects of transport network impairments because I-frames average two times the number of bytes needed for P-frames and five times the number of bytes needed for B-frames.

Conventionally, I-frames, P-frames and B-frames are transported over networks with the same network paths and quality of service. Accordingly, these frames are equally affected by the same channel conditions, including any channel impairments. If there is any loss of an I-frame packet, the quality of the entire video stream is effected, however, the loss of a P-frame or B-frame does not cause as severe of a degradation to the reproduced video.

Recognizing the different effects of loss of I-frames, P-frames and B-frames to the reproduced video, the present invention provides higher quality of service to I-frames than to P-frames and B-frames using a priority indication in the network transport packet. Accordingly, the encoded video frames from encoder 110 are provided to video frame type detector 115. Video frame type detector determines the type of video frame, i.e., whether the frame is an I-frame, P-frame or B-frame, and creates a header or flag indicating that this packet should be provided with a higher quality of service. Data transport device 120 receives the packets from video frame type detector and forms a network transport packet with a quality of service indicated in the network transport packet according to the particular network transport protocol.

Figure 2:
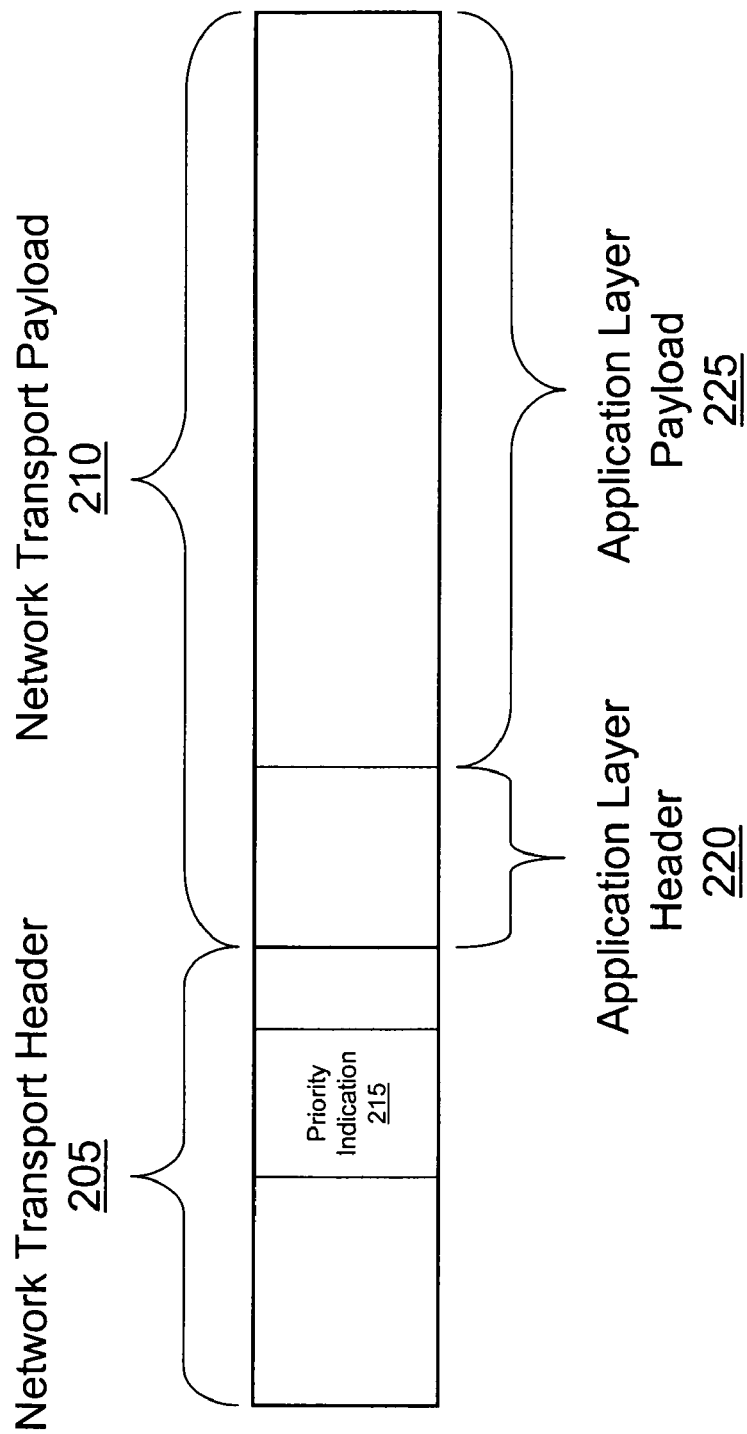
FIG. 2 is a block diagram of an exemplary network transport packet in accordance with the present invention.

FIG. 2 is a block diagram of an exemplary network transport packet in accordance with the present invention. As illustrated in FIG. 2, the network transport packet 200 includes a network transport header 205 and network transport payload 210. The network transport header 205 includes a number of different fields; including a priority indication field 215. For example, when the network transport packet is an internet protocol (IP) packet, the priority indication field 215 can be a type of service (ToS) bit. Other types of network transport packets can include other types of priority indication fields, such as a virtual local area network (VLAN) tag, or the like. The network transport payload 210 includes the particular video frame, which includes an application layer header 220 and application layer payload 225. By employing the priority indication 215 of the network transport packet 200, particular video frames can be provided with higher quality of service in a manner transparent to the transport network. In other words, the various elements of the transport network do not have to be aware, i.e., examine the network transport payload, in order to provide the higher quality of service to the different types of video frames. Accordingly, the present invention does not require any changes to the transport network in order to provide higher quality of service to particular frames.

Returning now to FIG. 1, after forming the network transport packets with the appropriate quality of service, data transport device 120 stores the packets in a buffer 125 for transmission to network 130. Specifically, it is desirable to transmit the stream of network transport packets in blocks of video frames. Accordingly, buffer 125 stores the packets until a block of video frames has been received. Any congestion in buffer 125 will result in packets with a lower priority level being dropped by buffer 125, thereby preserving the packets with a higher priority level. After a block of packets have been received, the data transport device 120 will then send the packets to the destination over transport network 130. All network entities within network 130 will then handle the network transport packets in accordance with the indicated priority level in the individual packets.

Figure 3:
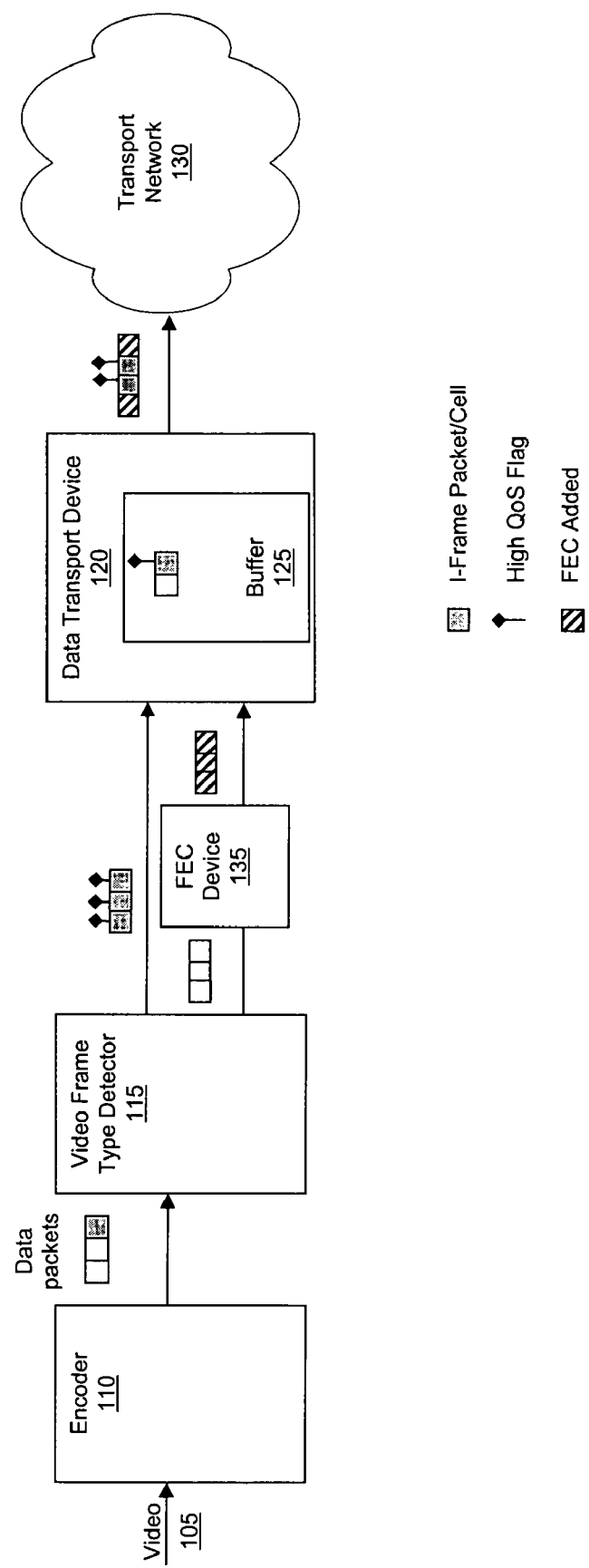
FIG. 3 is a block diagram of an exemplary system in accordance with one aspect of the present invention.

FIG. 3 is a block diagram of an exemplary system in accordance with one aspect of the present invention. FIG. 3 includes similar elements to those discussed above with regard to FIG. 1, and accordingly, a detailed description of these elements will not be repeated. In addition to the elements described above in connection with FIG. 1, the system of FIG. 3 includes a forward error correction (FEC) coding device 135 between video frame type detector 115 and data transport device 120. Accordingly, flagged packets, i.e., I-frames, are passed directly to data transport device 120, while un-flagged packets, i.e., P-frames and B-frames, are forward error correction coded before being passed onto data transport device 120. The various packets are then reassembled into their original streams as a block of video frames for transmission over transport network 130. Because FEC coding requires a seven to twenty-five percent increase in transport capacity to accommodate the additional coding, applying it only to the smaller P-frames and B-frames, rather than the entire video stream, reduces bandwidth requirements.

Figure 4:
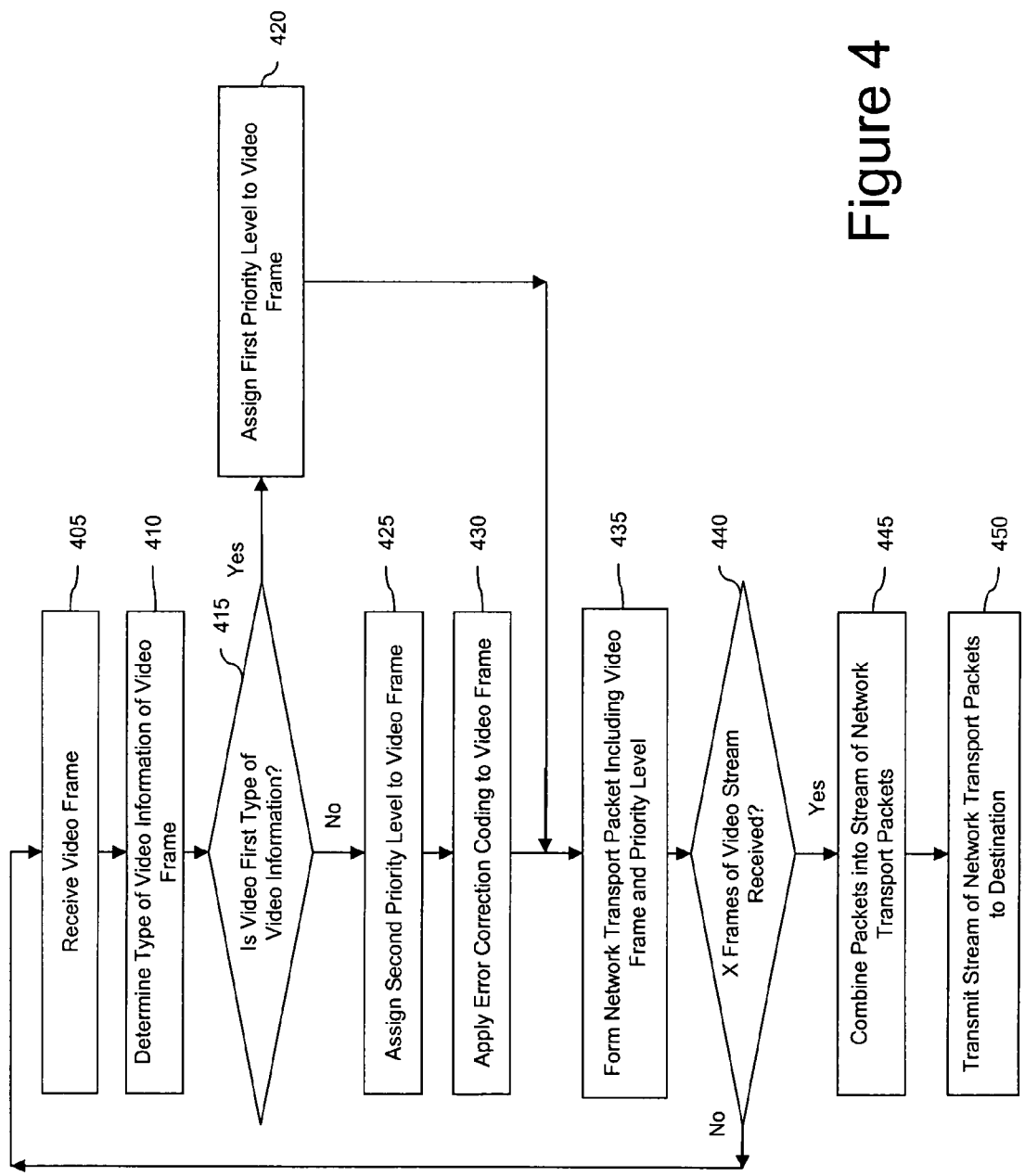
FIG. 4 is a flow diagram of an exemplary method for transmitting video information in accordance with the present invention.

FIG. 4 is a flow diagram of an exemplary method for transmitting video information in accordance with the present invention. A plurality of video frames are received (step 405), and the type of video information in a first video frame of the plurality of video frames is determined (step 410). When the video frame is a first type of video information, e.g., an I-frame, ("Yes" path out of decision step 415), then a first priority level is assigned to the video frame (step 420). When the video frame is not the first type of video information, e.g., a P-frame or B-frame, ("No" path out of decision step 415), then a second priority level is assigned to the video frame (step 425). If there are more than two priority levels in a particular network protocol, the second priority level can be a higher priority level than typical network traffic. Error correction coding is then applied to the second priority level video frame (step 430).

After applying error correction coding to the second priority level video frame (step 430) or after assigning a first priority level to a video frame (step 420), then a network transport packet is formed including the video frame and the determined priority level (step 435). The system then determines whether a predetermined number of frames X of the video stream, i.e., a block of frames, have been received (step 440). When the predetermined number of frames have not been received ("No" path out of decision step 440), then the system receives the next video frame (step 405). If, however, a predetermined number of video frames X have been received ("Yes" path out of decision step 440), then the packets are combined into a stream of network transport packets (step 445) and transmitted to the destination over the transport network (step 450).

The present invention, by providing the higher quality of service to I-frames can be used to reduce the I-frame repetition in a video stream. This will in turn reduce the bandwidth consumed by a particular video stream.

Although exemplary embodiments have been described above in connection with a particular type of video encoding, the present invention is equally applicable to other types of video encoding.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for transmitting video, the method comprising the acts of:
    receiving a plurality of video frames;
    determining that a first video frame of the plurality of video frames is a first type of video frame;
    assigning a priority level to the first video frame based on the first type of video frame, wherein the assigned priority level is selected from at least a first and a second priority level, the first priority level indicates a higher Quality of Service (QoS) than the second priority level, wherein when the first video frame is assigned the first priority level, the first video frame is not forward error correction encoded, and when the first video frame is assigned the second priority level the first video frame is forward error correction encoded;
    forming a first network transport packet including the first video frame, wherein a priority level of the first network transport packet is set based on the assigned priority level of the first video frame, and wherein the priority level for the first network transport packet is represented by a virtual local area network tag in the priority indication field of the header of the first network transport packet;
    combining the first network transport packet with other network transport packets including other frames of the plurality of video frames to form a stream of network transport packets; and
    transmitting the stream of network transport packets.

2. The method of claim 1, further comprising the acts of:
    determining that a second video frame of the plurality of video frames is a second type of video frame;
    assigning a second priority level to the second video frame based on the second type of video frame; and forming a second network transport packet including the second video frame, wherein a priority level of the second network transport packet is set based on the assigned second priority level of the second video frame, and wherein the second network transport packet is combined with the first network transport packet into the stream of network transport packets.

3. The method of claim 2, further comprising the act of:
coding the second video frame based on the second type of video frame.

4. The method of claim 3, wherein the coding is a forward error correction (FEC) coding.

5. The method of claim 1, wherein the first video frame is an I-frame when the first video frame is assigned the first priority level and the second video frame is a B-frame or P-frame when the second video frame is assigned the second priority level.

6. The method of claim 1, wherein the first network transport packet includes a header portion and a payload portion, the payload portion includes the first video frame, and the priority level of the first packet is included in the header portion of the first network transport packet.

7. The method of claim 6, wherein the first network transport packet is an Internet Protocol (IP) packet.

8. The method of claim 6, wherein the first network transport packet is an asynchronous transfer mode (ATM) packet.

9. The method of claim 1, wherein the stream of network transport packets is transmitted over a wired communication link.

10. The method of claim 1, wherein the stream of network transport packets is transmitted over a wireless communication link.

11. A method for transmitting video, the method comprising the acts of:
determining that a first video frame is a first type of video frame;
assigning a priority level to the first video frame based on the first type of video frame, wherein the assigned priority level is selected from at least a first and a second priority level, the first priority level indicates a higher Quality of Service (QoS) than the second priority level, wherein when the first video frame is assigned the first priority level, the first video frame is not forward error correction encoded, and when the first video frame is assigned the second priority level the first video frame is forward error correction encoded;
forming a first network transport packet including the first video frame, wherein a priority level of the first network transport packet is set based on the first type of video frame, and wherein the priority level for the first network transport packet is represented by a virtual local area network tag in the priority indication field of the header of the first network transport packet; and
transmitting the first network transport packet.

12. The method of claim 11, further comprising the acts of:
determining that second video frame is a second type of video frame;
forming a second network transport packet including the second video frame, wherein a priority level of the second network transport packet is set based on the second type of video frame; and
transmitting the second network transport packet.

13. The method of claim 12, further comprising the act of:
coding the second video frame based on the second type of video frame.

14. The method of claim 13, wherein the coding is a forward error correction (FEC) coding.

15. The method of claim 11, wherein the first video frame is an I-frame when the first video frame is assigned the first priority level and the second video frame is a B-frame or P-frame when the second video frame is assigned the second priority level.

16. The method of claim 11, wherein the first network transport packet includes a header portion and a payload portion, the payload portion includes the first video frame, and the priority, level of the first packet is included in the header portion of the first network transport packet.

17. The method of claim 16, wherein the first network transport packet is an Internet Protocol (IP) packet.

18. The method of claim 16, wherein the first network transport packet is an asynchronous transfer mode (ATM) packet.

19. The method of claim 11, wherein the first network transport packet is transmitted over a wired communication link.

20. The method of claim 11, wherein the first network transport packet is transmitted over a wireless communication link.

* * * * *